US012574609B2

(12) United States Patent
Zhang et al.

(10) Patent No.: US 12,574,609 B2
(45) Date of Patent: Mar. 10, 2026

(54) METHOD, APPARATUS, DEVICE AND MEDIUM FOR IP QUALITY DATA PROCESSING IN CDN

(71) Applicant: Beijing Volcano Engine Technology Co., Ltd., Beijing (CN)

(72) Inventors: Jianwei Zhang, Beijing (CN); Yousheng Zheng, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 19/073,463

(22) Filed: Mar. 7, 2025

(65) Prior Publication Data
US 2025/0301204 A1 Sep. 25, 2025

(30) Foreign Application Priority Data
Mar. 21, 2024 (CN) .......................... 202410330057.1

(51) Int. Cl.
H04N 21/647 (2011.01)
H04L 43/0805 (2022.01)
H04L 43/0852 (2022.01)

(52) U.S. Cl.
CPC ... H04N 21/64738 (2013.01); H04L 43/0805 (2013.01); H04L 43/0852 (2013.01)

(58) Field of Classification Search
CPC .......... H04N 21/64738; H04L 43/0805; H04L 43/0852; H04L 43/08; H04L 67/10; H04L 67/5681
See application file for complete search history.

(56) References Cited

U.S. PATENT DOCUMENTS

2005/0128943 A1* 6/2005 Gibbs ..................... H04L 43/00
370/229
2011/0252142 A1 10/2011 Richardson et al.
(Continued)

FOREIGN PATENT DOCUMENTS

CN 102136969 A 7/2011
CN 106533722 A 3/2017
(Continued)

OTHER PUBLICATIONS

Chinese Patent Application No. 202410330057.1; First Office Action dated May 9, 2024, 24 pages with machine translation.
(Continued)

*Primary Examiner* — Muhammad Raza
(74) *Attorney, Agent, or Firm* — BakerHostetler

(57) ABSTRACT
Embodiments of the present disclosure provide solutions for Internet Protocol (IP) quality data processing in a content delivery network (CDN). In a solution, a plurality of data samples are collected from at least one data source related to a CDN, at least one IP address segment is determined from the plurality of data samples, each IP address segment corresponding to an IP address range of a service node in the CDN, a group of data samples related to the IP address segment are selected from the plurality of data samples for each of the at least one IP address segment, and a quality value of the IP address segment in terms of a plurality of quality indicators is determined for each of the at least one IP address segment based on transmission performance data included in the group of data samples related to the IP address segment.

15 Claims, 6 Drawing Sheets

(56)                    References Cited

U.S. PATENT DOCUMENTS

| | | | |
|---|---|---|---|
| 2013/0054828 A1* | 2/2013 | Nishi | H04L 67/1034 |
| | | | 709/232 |
| 2016/0294642 A1 | 10/2016 | Hopkins et al. | |
| 2016/0316423 A1* | 10/2016 | Jia | H04W 48/17 |
| 2017/0208114 A1* | 7/2017 | Titus | H04L 43/00 |
| 2019/0020620 A1* | 1/2019 | Byrne | H04L 61/4511 |
| 2020/0052980 A1* | 2/2020 | Fu | H04L 41/145 |
| 2021/0218655 A1* | 7/2021 | Zheng | H04L 61/5007 |
| 2022/0272019 A1* | 8/2022 | Zhou | H04L 61/4511 |

FOREIGN PATENT DOCUMENTS

| | | |
|---|---|---|
| CN | 106603340 A | 4/2017 |
| CN | 107465526 A | 12/2017 |
| CN | 109962790 A | 7/2019 |
| CN | 113691420 A | 11/2021 |
| CN | 114124897 A | 3/2022 |
| CN | 115022278 A | 9/2022 |
| CN | 116743763 A | 9/2023 |
| CN | 117938713 A | 4/2024 |
| WO | WO 2021/138956 A1 | 7/2021 |

OTHER PUBLICATIONS

Chinese Patent Application No. 202410330057.1; Second Office Action dated May 30, 2024, 18 pages with machine translation.
Chinese Patent Application No. 202410330057.1; Notice of Allowance dated Jun. 24, 2024, 13 pages with machine translation.
International Patent Application No. PCT/CN2025/077455; International Search Report dated Apr. 24, 2025, 6 pages with machine translation.
European Patent Application No. 25165359.8; Extended European Search Report dated Dec. 2, 2025, 11 pages.

* cited by examiner

100

110

120

CONTENT DELIVERY
NETWORK

DATA PROCESSING SYSTEM

400

METHOD, APPARATUS, DEVICE AND MEDIUM FOR IP QUALITY DATA PROCESSING IN CDN

CROSS-REFERENCE

The present application claims priority to Chinese Patent Application No. 202410330057.1, filed on Mar. 21, 2024, and entitled "METHOD, APPARATUS, DEVICE AND MEDIUM FOR IP QUALITY DATA PROCESSING IN CDN", the entirety of which is incorporated herein by reference.

FIELD

Example embodiments of the present disclosure generally relate to the field of computers, and in particular, to a method, an apparatus, a device and a computer-readable storage medium for Internet Protocol (IP) quality data processing in a content delivery network (CDN).

BACKGROUND

With the development of Internet technologies, the need of individual users for accessing a large amount of resources is gradually increasing. A content delivery network (CDN) warm-up technology allows caching the corresponding resources of a source station on CDN nodes before a user requests the resources for the first time. Thereby, when the user actually accesses the resources, the latest and already cached data may be directly acquired from the CDN nodes, which is efficient and fast.

CDN allows a user to access the required content nearby, thereby solving the problem of network congestion and improving the response speed of the user to access a website. In CDN, in order to further improve the efficiency of content delivery, some service providers may detect the Internet Protocol (IP) quality of service nodes owned by them to guide the scheduling of content. However, such IP quality assessment has a limited scope. In addition, for a plurality of different service scenarios, the corresponding service data is scattered in different data sets and there is no unified indicator information, and the query and manual aggregation cost is high and cannot meet the usage requirements.

SUMMARY

In a first aspect of the present disclosure, an Internet Protocol (IP) quality data processing method in a content delivery network (CDN) is provided. The method includes: collecting a plurality of data samples from at least one data source related to a CDN, each data sample including a client IP address and a service node IP address for performing data transmission in the CDN, and transmission performance data related to the data transmission; determining at least one IP address segment from the plurality of data samples, each IP address segment corresponding to an IP address range of a service node in the CDN; for each of the at least one IP address segment, selecting, from the plurality of data samples, a group of data samples related to the IP address segment; and for each of the at least one IP address segment, determining a quality value of the IP address segment in terms of a plurality of quality indicators based on transmission performance data included in the group of data samples related to the IP address segment.

In a second aspect of the present disclosure, an Internet Protocol (IP) quality data processing apparatus in a content delivery network (CDN) is provided. The apparatus includes: a collection module configured to collect a plurality of data samples from at least one data source related to the CDN, each data sample including a client IP address and a service node IP address for performing data transmission in the CDN, and transmission performance data related to the data transmission; an execution module configured to determine at least one IP address segment from the plurality of data samples, each IP address segment corresponding to an IP address range of a service node in the CDN; a selection module configured to: for each of the at least one IP address segment, select, from the plurality of data samples, a group of data samples related to the IP address segment; and a determination module configured to: for each of the at least one IP address segment, determine a quality value of the IP address segment in terms of a plurality of quality indicators based on transmission performance data included in the group of data samples related to the IP address segment.

In a third aspect of the present disclosure, an electronic device is provided. The electronic device includes: at least one processing unit; and at least one memory coupled to the at least one processing unit and storing instructions executable by the at least one processing unit, the instructions, when executed by the at least one processing unit, causing the electronic device to perform the method in the first aspect of the present disclosure.

In a fourth aspect of the present disclosure, a computer-readable storage medium is provided. The computer-readable storage medium stores a computer program executable by a processor to perform the method according to the first aspect of the present disclosure.

It should be understood that the content described in the Summary section is not intended to limit the key features or important features of the embodiments of the present disclosure, nor is it intended to limit the scope of the present disclosure. Other features of the present disclosure will become readily comprehensible through the following description.

BRIEF DESCRIPTION OF THE DRAWINGS

Hereinafter, the above and other features, advantages and aspects of various implementations of the present disclosure will become more apparent with reference to the drawings and the following detailed description. In the drawings, the same or similar reference numerals denote the same or similar elements, where.

DETAILED DESCRIPTION

Figure 1:
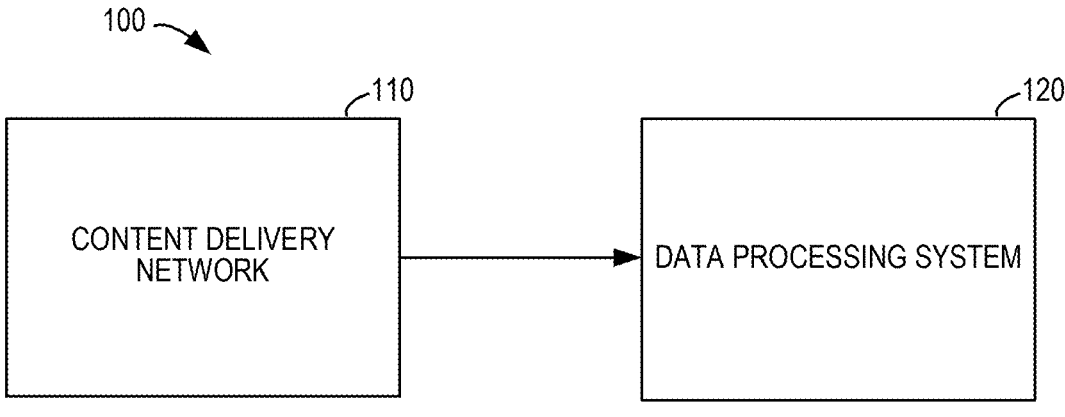
FIG. 1 illustrates a schematic diagram of an example environment in which embodiments of the present disclosure can be implemented.

Embodiments of the present disclosure will be described in more detail below with reference to the drawings. While certain embodiments of the present disclosure are shown in the drawings, it should be understood that the present disclosure may be implemented in various forms and should not be construed as limited to the embodiments set forth herein. Rather, these embodiments are provided for a thorough and complete understanding of the present disclosure. It should be understood that the drawings and embodiments of the present disclosure are only for example purposes and are not intended to limit the protection scope of the present disclosure.

In the description of the embodiments of the present disclosure, the term "include/include" and similar terms should be understood as open-ended inclusions, that is, "include/include but not limited to". The term "based on" should be understood as "at least partially based on". The term "one embodiment" or "the embodiment" should be understood as "at least one embodiment". The term "some embodiments" should be understood as "at least some embodiments". Other definitions, either explicit or implicit, may be included below.

As used herein, unless expressly stated, performing a step "in response to A" does not mean performing the step immediately after "A", but may include one or more intermediate steps.

It can be understood that the data involved in the technical solutions (including but not limited to the data itself, the acquisition, use, storage or deletion of the data) should comply with the requirements of corresponding laws, regulations and related provisions.

It can be understood that before using the technical solutions disclosed in the embodiments of the present disclosure, a related user should be informed of the type of information involved in the present disclosure, the scope of use, the usage scenarios, etc. in an appropriate manner according to relevant laws and regulations, and authorization from the related user should be obtained, where the related user may include any type of right subject, such as an individual, an enterprise, or a group.

For example, in response to receiving an active request from a user, prompt information is sent to the related user to explicitly prompt the related user that the operation requested to be performed will require the acquisition and use of information of the related user, so that the related user can independently select whether to provide information to software or hardware such as an electronic device, an application, a server, or a storage medium that performs the operations of the technical solutions of the present disclosure according to the prompt information.

As an optional but non-limiting implementation, a manner of sending prompt information to the related user in response to receiving an active request from the related user may be, for example, a pop-up window, and the prompt information may be presented in text in the pop-up window. In addition, the pop-up window may also include a selection control for the user to select "agree" or "disagree" to provide information to the electronic device.

It can be understood that the above process of notifying and acquiring user authorization is only illustrative and does not limit the implementations of the present disclosure, and other manners that meet relevant laws and regulations may also be applied to the implementations of the present disclosure. The activation of digital assistant-related functions, the acquired data, and the manner of processing and storing data, etc., in the embodiments of the present disclosure, should be pre-authorized by the user and other right subjects associated with the user, and should comply with the agreements of relevant laws and regulations and the agreements between the right subjects.

As discussed above, the node data of a traditional IP segment faces many service scenarios, and different service data is scattered in different data clusters. Moreover, dimensions, data indicators and units of different service data are not unified, the corresponding granularity and data delay are inconsistent, and the query and manual aggregation cost is high. In a scenario with multiple service types, it is extremely difficult for the node data of the traditional IP segment to perform quality assessment and implement quality scheduling using a single data source. For example, a video service not only depends on a network, but also needs to focus on the resolution capability of the service, and faster playing of the first frame is directly proportional to the user feedback. However, it is impossible to focus on a plurality of quality indicators using a single data source, which cannot meet the usage requirements.

In a content delivery network (CDN), traditionally, CDN manufacturers mainly report node data through self-built service nodes, and the range is limited in their own links. If high-frequency detour data is cited, too much cost is consumed, and reliable quality assessment and scheduling switching cannot be provided. The traditional dynamic link routing logic is also based on the selection of a preset network route, which cannot broaden the optimization choice on the user side, cannot optimize the access on the user side, and the user experience is not good.

In view of this, an embodiment of the present disclosure provides an IP quality data processing method in a CDN. The method includes: collecting, by a data processing system, a plurality of data samples from at least one data source related to a CDN, each data sample including a client IP address and a service node IP address for performing data transmission in the CDN, and transmission performance data related to the data transmission; determining at least one IP address segment from the plurality of data samples, each IP address segment corresponding to an IP address range of a service node in the CDN; for each of the at least one IP address segment, selecting, from the plurality of data samples, a group of data samples related to the IP address segment; and for each of the least one IP address segment, determining a quality value of the IP address segment in terms of a plurality of quality indicators based on transmission performance data included in the group of data samples related to the IP address segment. In this way, the quality of the IP segment may be learned based on the quality value corresponding to the IP segment, and a plurality of quality indicators may also be focused on to meet the usage requirements in different service scenarios, so that the access on the user side may be optimized and the user experience may be improved.

FIG. 1 illustrates a schematic diagram of an example environment 100 in which embodiments of the present disclosure can be implemented. In the environment 100, the CDN 110 is at least configured to deploy a plurality of server nodes within a certain range, and cache static resources and dynamic contents of a website on edge servers close to users. The data processing system 120 is configured to execute a plurality of data processing tasks and store data obtained by executing the plurality of data processing tasks.

The data processing system 120 may be any type of device with computing power, including a terminal device or a server-side device. The terminal device may be any type of mobile terminal, fixed terminal, or portable terminal, including a mobile phone, a desktop computer, a laptop computer, a notebook computer, a netbook computer, a tablet computer, a media computer, a multimedia tablet, a personal communication system (PCS) device, or any combination thereof, including accessories and peripherals of these devices or any combination thereof.

The CDN 110 may include, for example, a computing system/server, such as a mainframe, an edge computing node, a computing device in a cloud environment, and the like. The server-side device may be an independent physical server, a server cluster or distributed system formed by a plurality of physical servers, or a cloud server that provides basic cloud computing services such as cloud services, cloud databases, cloud computing, cloud functions, cloud storage, network services, cloud communication, middleware services, domain name services, security services, content delivery networks, and big data and artificial intelligence platforms. The server-side device may include, for example, a computing system/server, such as a mainframe, an edge computing node, a computing device in a cloud environment, and the like. In some embodiments, the data processing system 120 may be implemented based on cloud services.

It should be understood that the structure and function of the environment 100 are described for example purposes only, without implying any limitation to the scope of the present disclosure.

Figure 2:
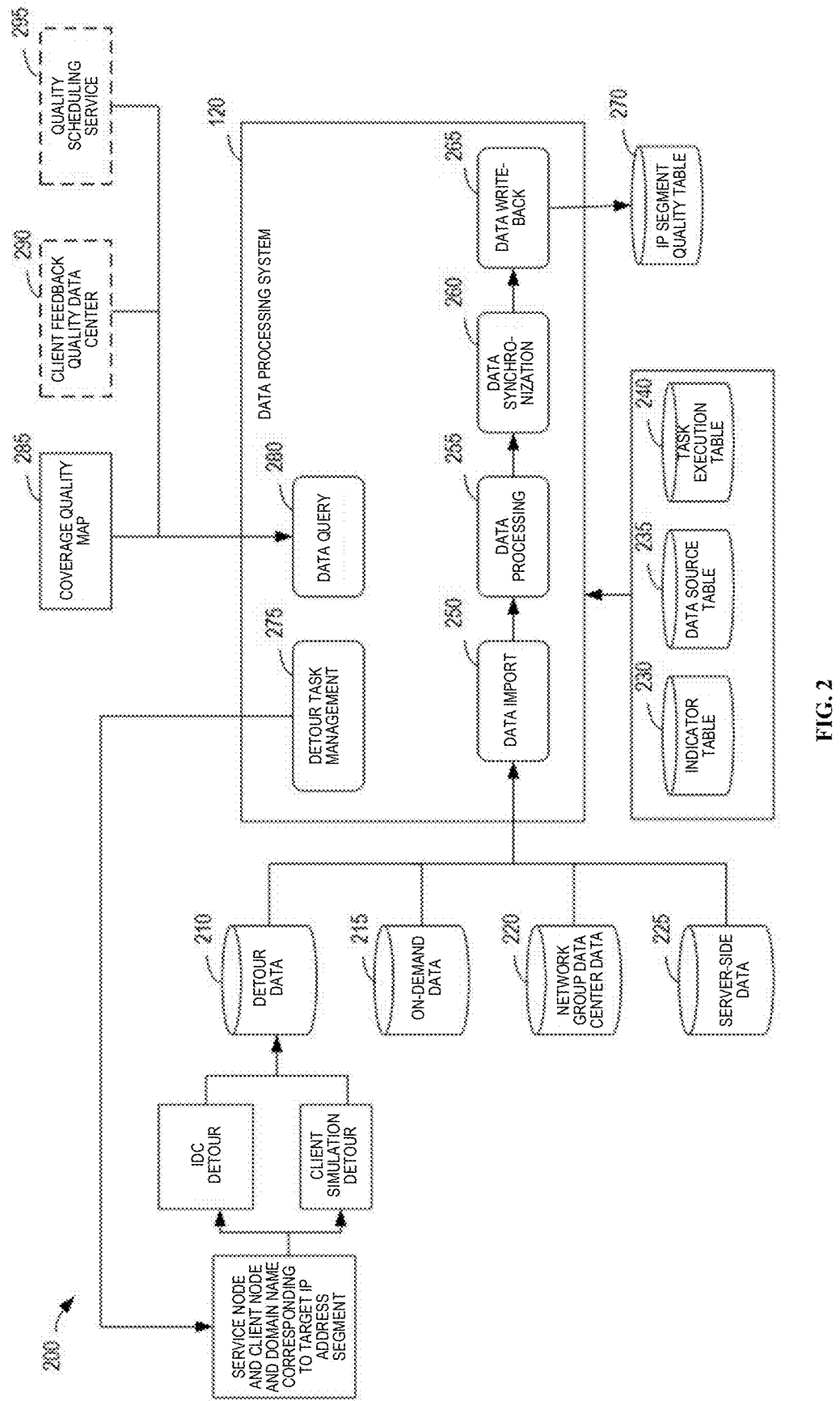
FIG. 2 illustrates a schematic diagram of IP quality data processing in a CDN according to some embodiments of the present disclosure.

FIG. 2 illustrates a schematic diagram of IP quality data processing in a CDN according to some embodiments of the present disclosure. As shown in FIG. 2, data processing tasks that may be executed by the data processing system 120 include data import 250, data processing 255, data synchronization 260, data write-back 265, a detour task management module 275, and data query 280.

The data processing system 120 collects a plurality of data samples from at least one data source related to the CDN 110, each data sample including a client IP address and a service node IP address for performing data transmission in the CDN 110, and transmission performance data related to the data transmission.

Data sources of the plurality of data samples imported through the data import 250 include detour data 210, on-demand data 215, network group data center data 220, server-side data 225, and the like.

In some embodiments, the data import 250 imports a plurality of data samples, and then the IP segment quality table 270 is obtained through the data processing 255, the data synchronization 260, and the data write-back 265. The IP segment quality table 270 may be represented as a database.

In some embodiments, the detour task management module 275 determines a target IP address segment to be assessed in the CDN 110, and generates a detour task for the target IP address segment. For example, it may indicate a service node and a client node (node_point) to be tested and a domain name (domain_probe) corresponding to the target IP address segment. The detour task management module 275 may control the detour task for the target IP address segment to be performed in the CDN, which may include Internet data center (IDC) detour or client simulation detour. By actively initiating the detour task, the lack or insufficiency of data samples on certain IP segments or IP addresses may be compensated. In this way, the data processing system 120 may collect detour data related to the detour task from at least one client or at least one service node in the CDN, and obtain at least one data sample from the detour data. In some embodiments, the data source of the detour data 210 may include IDC detour and client simulation detour.

In some embodiments, sources of the data samples (including IP addresses and their corresponding transmission performance data) include on-demand, detour, reporting from the CDN manufacturer side, etc., and quality indicators are distributed in the IP segment quality table and service interface of each service according to service scenarios. The IP segment quality table 270 may be determined by the data processing system 120 based on the quality indicator table 230, the data source table 235, the task execution table 240, and the like.

In some embodiments, the data processing system 120 may preset a duration, for example, the preset duration is 5 minutes, and the indicator information query is periodically acquired from the quality indicator table based on the preset duration to obtain a quality indicator information data set containing a plurality of quality indicator information.

In some embodiments, if a plurality of service nodes or clients in the CDN need to fight for a lock to execute the current task, one service node or client may be selected to execute tasks corresponding to all quality indicators, so as to facilitate subsequent data aggregation.

Figure 3:
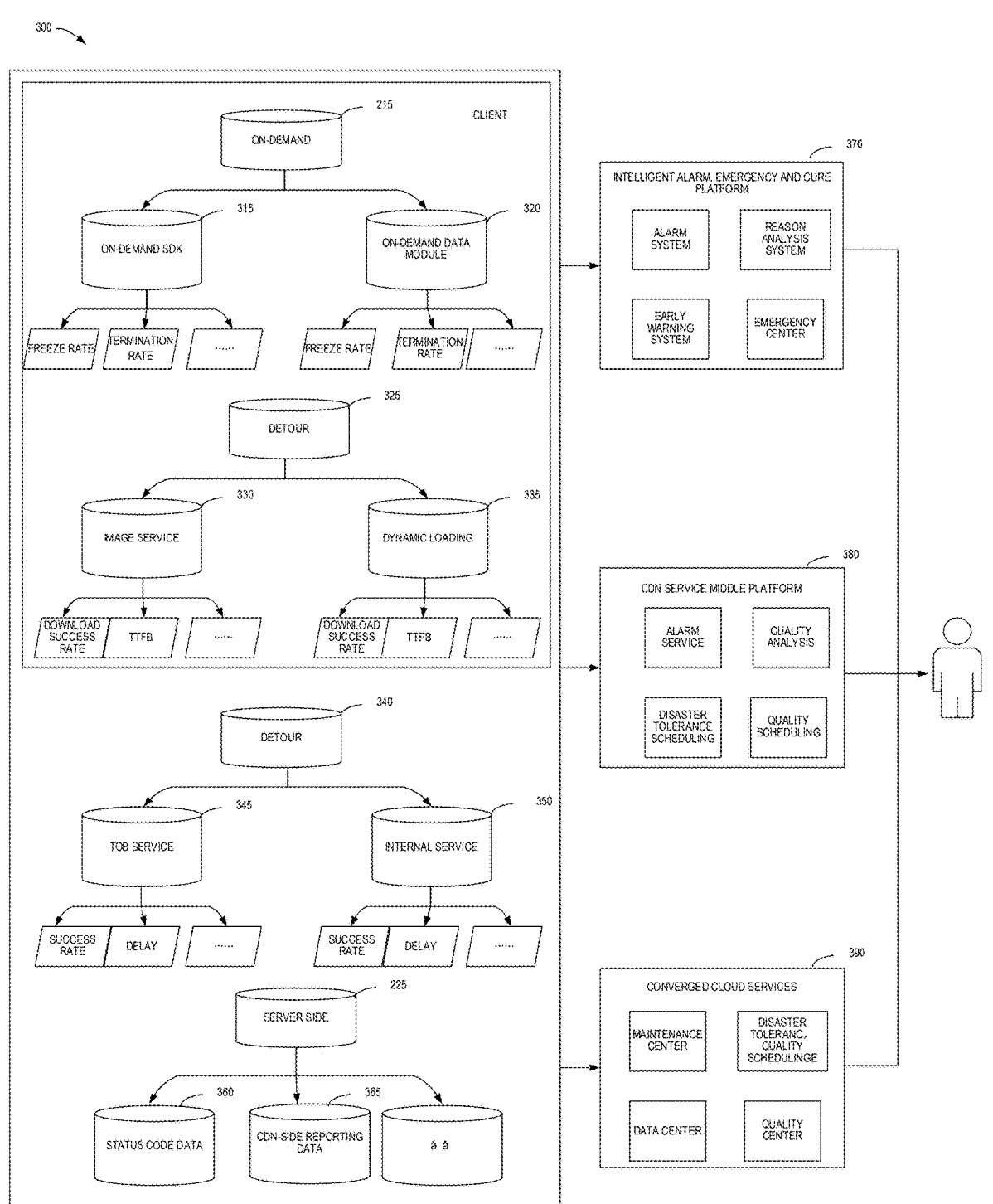
FIG. 3 illustrates a schematic diagram of an IP quality data processing and application architecture in a CDN according to some embodiments of the present disclosure.

FIG. 3 illustrates a schematic diagram of an IP quality data processing and application architecture 300 in a CDN according to some embodiments of the present disclosure.

In some embodiments, the data sources of the client include on-demand 215 and detour 325. The data sources of the on-demand 215 include an on-demand SDK 315 and an on-demand data module 320, where quality indicators of the on-demand SDK 315 may include a freeze rate, a termination rate, etc., and quality indicators of the on-demand data module may include a freeze rate, a termination rate, etc. The data sources of the detour 325 include an image service 330 and a dynamic loading 335, where quality indicators of the image service 330 may be a download success rate, a time to first byte (TTFB), etc., and quality indicators of the dynamic loading 335 may be a download success rate, a TTFB, etc. The data sources of the server side include a detour 340 and a server side 225. The data sources of the detour 340 may include a ToB service 345 and an internal service 350, where quality indicators of the ToB service 345 may be a success rate, a delay, etc., and quality indicators of the internal service 350 may be a success rate, a delay, etc. The data sources of the server side 225 may be status code data 360, CND-side reporting data 365, and the like.

In some embodiments, the information used to create the IP segment quality table 270 includes dimension information and quality indicators. A plurality of dimension standards may be preset, and the dimension information in the data dimension needs to meet the plurality of preset dimension standards before it may be stored in the data dimension library. There may be a case where the data dimension does not include complete dimension information, for example, the availability of a domain name, including an alias (cname) record, may not include information about a CDN service provider, for example, the on-demand video data includes the first frame, but the quality indicator data such as an image download is not included. A method of nullifying the absent information or uniformly encoding the absent information for compatibility may be used to make the dimension information meet the dimension standards. The processed dimension information is compared with the preset multi-dimensional standards to determine whether the processed dimension information meets the preset multi-dimensional standards, and if the processed dimension information meets the preset multi-dimensional standards, the processed dimension information is used as legal dimension information. After the aggregation of all data containing the legal dimension is completed, the data dimension corresponding to the data containing the legal dimension may be converted into some data tables for storage. An example storage form of the data dimension may be described in detail below in FIG. 4.

In some embodiments, the data processing system 120 determines at least one IP address segment from the plurality of data samples, each IP address segment corresponding to an IP address range of a service node in the CDN, and the IP address range may be obtained based on pre-division. For each of the at least one IP address segment, a group of data samples related to the IP address segment is selected from the plurality of data samples. For each of the at least one IP address segment, the transmission performance data included in the group of data samples related to the IP address segment is based on.

Each data sample indicates the performance of data transmission from the client IP to the service node IP, for example, data related to quality indicators such as whether the download is successful, whether it is stuck, and network round-trip time. Based on the transmission performance data in the collected data samples, the data processing system 120 can determine the quality value of the corresponding IP address segment in terms of the plurality of quality indicators. In some embodiments, the plurality of quality indicators to be determined by the data processing system 120 may be pre-configured, or specified by a user, such as an administrator.

In some embodiments, the data processing system 120 may use a synchronous aggregator to aggregate the indicator information corresponding to each data containing the legal dimension information into one object. The example aggregation object form is described in detail in FIG. 4 below.

Figure 4:
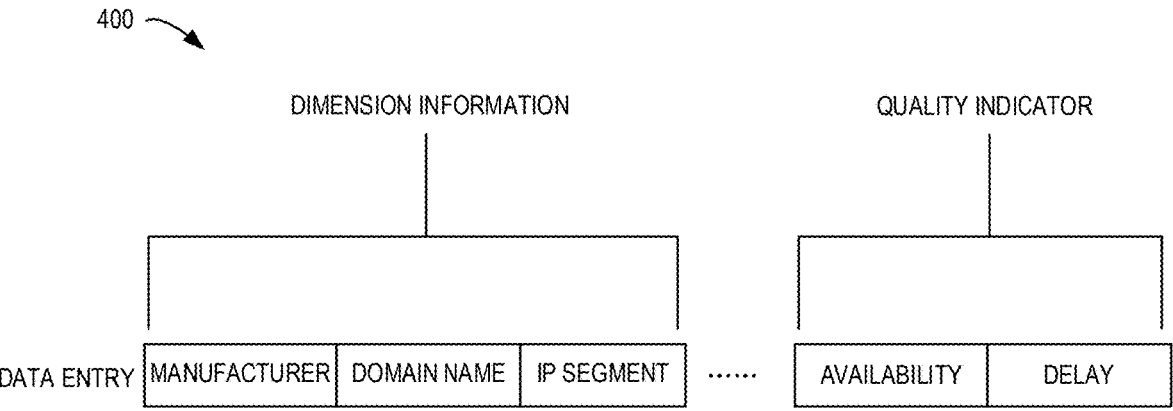
FIG. 4 illustrates a schematic diagram of a data entry according to some embodiments of the present disclosure.

FIG. 4 illustrates a schematic diagram of an example data entry 400 according to some embodiments of the present disclosure. The data entry 400 includes a dimension information part and a quality indicator part. The data dimension part may include information of a plurality of dimensions such as a manufacturer, a domain name, and an IP segment, and the quality indicator part may include a plurality of quality indicators such as availability and delay.

In some embodiments, the data entry 400 includes at least an IP address segment, data corresponding to at least one data dimension associated with the IP address segment, and a quality value of the IP address segment in terms of the plurality of quality indicators.

In some embodiments, a synchronous aggregator may be used to aggregate the indicator information corresponding to each data containing the legal dimension information into one object, and the objects obtained by aggregating a plurality of data respectively form the data entry 400. The indicator data currently acquired may be cached through the memory.

In some embodiments, after the aggregation of all data containing the legal dimension is completed, the indicator information corresponding to the data containing the legal dimension may be converted into a corresponding data table for storage through a data reading and writing module of the data processing system 120, and stored in the IP segment quality database. The indicator information includes dimension information and quality indicators, and the data table corresponding to the data containing the legal dimension may include a dimension information table and a quality indicator table.

In some embodiments, the IP segment quality database may be obtained by aggregating multi-dimensional and multi-terminal quality data. The data in the IP segment quality database has characteristics such as real-time and multi-dimensional aggregation, and may provide multiple service capabilities of monitoring, operation, and maintenance.

In some embodiments, in each data entry, the at least one data dimension associated with the IP address segment includes at least one of: information about a service node corresponding to the IP address segment, information about a client corresponding to the IP address segment, a service type corresponding to the IP address segment, a data source for determining the quality value of the IP address segment in terms of the plurality of quality indicators, or network information corresponding to the IP address segment.

In some embodiments, as shown in Table 1, the dimension information table may include information about the service node corresponding to the IP address segment, which may be a service manufacturer, a service domain name, a country where the server side is located, a province where the server side is located, an operator where the server side is located, an IP segment to which the server side belongs, and the IP segment to which the server side belongs, which may be 1.1.1.0/24 or 2.2.2.0/28, and so on. The dimension information table may include information about the client corresponding to the IP address segment, which may be a country where the client is located, a province where the client is located, an operator where the client is located, etc.

The dimension information table may also include the service type corresponding to the IP address segment, which may include a service serving type, such as: image, on-demand, download, dynamic, etc. The dimension information table may also include a data source for determining the quality value of the IP address segment in terms of the plurality of quality indicators, for as: Net, video, detour, device, CDN, etc.

The dimension information table may also include the network information corresponding to the IP address segment, for example: whether a connection is reused, a protocol type, a status code, a network type, whether a connection is reused may include unknown, reuse, and no reuse, the protocol type may include Http, https, and the network type may be Wifi, mobile, idc, lastmail, etc.

TABLE 1

| English name | Chinese name | Description | Value description |
|---|---|---|---|
| vendor | Cloud service provider | Service provider | |
| domain | Domain name | Service domain name | |
| client_country | Client country | Country of client | |
| client_province | Client province | Province of client node | |

TABLE 1-continued

| English name | Chinese name | Description | Value description |
|---|---|---|---|
| client_carrier | Client operator | Operator of client node | |
| server_country | CDN country | Country of server side | |
| server_province | CDN province | Province of server side | |
| server_carrier | CDN operator | Operator of server side | |
| domain_type | Service type | Service serving type | Image/on-demand/download/dynamic |
| cdn_ip_segment | IP segment of cdn | IP segment of server side | For example, 1.1.1.0/24 or 2.2.2.0/28 |
| datasource | Data source | Data source information | Net/video/detour/device/cdn |
| is_reconnect | Whether to reuse link | Whether to reuse link | Unknown/reuse/no reuse |
| protocol | Protocol type | | Http/https |
| status_code | Status code | | |
| net_type | Network type | | Wifi/mobile/idc/lastmail |

In some embodiments, the quality indicator table is as shown in Table 2 below, and may include at least one of the following: a download success rate, whose indicator name may be represented as download_success_rate, and the value range of the download success rate may be [0, 1]; an on-demand freeze rate, whose indicator name may be represented as video_buffered_rate, and the value range of the on-demand freeze rate may be [0, 1]; a network round-trip time, whose indicator name may be represented as rtt, and the unit of the network round-trip time may be milliseconds (ms); a dns request time, whose indicator name may be represented as dns_time; an ssl time-consuming, whose indicator name may be represented as ssl_time; a tcp time-consuming, whose indicator name may be represented as tcp_time; a total time-consuming of a complete request, whose indicator name may be represented as total_time; where the network round-trip time, the dns request time, the ssl time-consuming, the tcp time-consuming, and the total time-consuming of the complete request may all have a unit of ms; a request header+body, whose indicator name may be represented as recv_total, and the unit may be bytes (bit); a download speed, whose indicator name may be represented as download_speed, and the unit may be MB/s, and the download speed may be used for indicator verification on whether it is consistent with total_time/recv_total; a sampling ratio, whose indicator name may be represented as sample_multiple, and the value may be selected as one thousandth, one ten-thousandth, etc., and the sampling ratio is used to exclude some data.

In some embodiments, in order to generate the IP segment quality table 270, data processing needs to be performed on the imported original data. The data processing includes an aggregation process for which the main keys are the client IP segment and the service node IP segment. Through the binding relationship between the client IP segment and the server IP segment, other values are selected as attributes for aggregation sampling processing, and data storing is performed on the quality data corresponding to the pre-divided server IP address segment after aggregation sampling processing. For example, data samples corresponding to the client IP 1.1.1.1, the server IP 2.2.2.2, and the server IP 3.3.3.3 are distinguished, and the unique correspondence of the data samples should be 1.1.1.0-(2.2.2.0) and 1.1.1.0-(3.3.3.0). For another example, data corresponding to the client IP 1.1.1.1, the client IP 4.4.4.4, and the service node IP 2.2.2.2 are distinguished, and the unique correspondence of the data samples should be 1.1.1.0-(2.2.2.0), and no additional special key is created at this time.

In some embodiments, the attribute-related aggregation process may be to calculate an average value. For example, the aggregated value of the download success rate is to multiply the data value corresponding to the quality indicator currently focused on by the sampling ratio, and then add the products to obtain the quality value of the current IP segment. The data value corresponding to the quality indicator currently focused on is an accumulated value calculated after multiple samplings, the sampling ratio is to perform sampling once at intervals of a preset duration during data sample collection, and the sampling ratio is not considered as a quality value, but a description of the data

TABLE 2

| Indicator name | Description | Value |
|---|---|---|
| download_success_rate | download success rate | [0, 1] |
| video_buffered_rate | on-demand freeze rate | [0, 1] |
| rtt | network round-trip time | ms |
| dns_time | dns request time | ms |
| ssl_time | Ssl time-consuming | ms |
| tcp_time | tcp time-consuming | ms |
| total_time | total time-consuming of complete request | ms |
| recv_total | including request header + body | bytes |
| download_speed | download speed (used for indicator verification on whether it is consistent with total_time/recv_total) | MB/s |
| sample_multiple | sampling ratio | for example, one thousandth, one ten-thousandth |

11 sample collection. For example, the quality indicators currently focused on include a download success rate, an on-demand freeze rate, and a network round-trip time, the accumulated value of the download success rate is A and the sampling ratio is 30%, the accumulated value of the on-demand freeze rate is B and the sampling ratio is 20%, and the accumulated value of the network round-trip time is C (the unit of C is s, and if the unit is ms, unit conversion is required) and the sampling ratio is 10%, then the quality value of the current IP segment may be: A×30%+B×20%+ C×10%. The sampling ratio here may be set according to the needs of different applications.

In some embodiments, some faults may cause a reduction in regional availability, so event injection needs to be supported. In an emergency, when a network segment disconnection and a service unavailability may exist at a certain time acquired by other means, the quality condition of the network segment may be set to unavailable in advance.

Some example embodiments of the present disclosure will be described below with continued reference to the drawings.

Quality values of a plurality of IP address segments in terms of a plurality of quality indicators may form the obtained IP segment quality table 270. In some embodiments, the IP segment quality table 270 may be used to interface with multiple related services such as alarm, disaster tolerance, and quality, to provide data availability at the IP segment level. In some embodiments, when the data query 280 of the data processing system 120 receives a data query request, the back end will provide the data situation of the current similar IPs according to the IP situation of the request, and the data query request may be expanded into multiple dimensions. In some embodiments, the data processing system 120 may support data queries from different services, service ends, etc., such as a coverage quality map 285, a client feedback quality data center 290, a quality scheduling service 295, etc. as shown in FIG. 2.

In some embodiments, the IP segment quality table generated by the data processing system 120 may be used for an intelligent alarm, emergency and cure platform 370 in FIG. 3. The intelligent alarm, emergency and cure platform 370 includes an alarm system, an early warning system, a reason analysis system, and an emergency center.

In some embodiments, the IP segment quality table generated by the data processing system 120 may be used for a CDN service middle platform 380 in FIG. 3. Services that may be provided by the CDN service middle platform 380 include an alarm service, disaster tolerance scheduling, quality analysis, and quality scheduling.

In some embodiments, the IP segment quality table generated by the data processing system 120 may also be used for converged cloud services 390 in FIG. 3. The converged cloud services 390 include a maintenance center, a data center, disaster tolerance, quality scheduling, and a quality center.

In some embodiments, when an abnormality occurs, the area of the network abnormality may be fed back through an abnormal network situation of the IP segment, for example, it may be a problem in a large area, a problem in a small computer room, or an abnormality of a single machine. In a large network architecture scenario, due to the characteristics of real-time performance, the range of abnormal situations may be distinguished by utilizing problem discovery capability, so that alarms may be given in time and abnormal situations may be handled.

In some embodiments, the data query 280 of the data processing system 120 may also perform a quality scheduling service 295. The IP recommendation capability of the quality scheduling service 295 is similar, and may support the capability of manufacturer recommendation. Based on the quality value of the current IP segment obtained, the most suitable service provider is recommended through the distribution of the device of the previously aggregated manufacturer in the current IP segment.

In some embodiments, for different services, the quality indicators of interest are different. For example, a download service focuses on a network first packet and network quality, and an on-demand service focuses on a first frame time and a freeze rate. In this way, the quality indicators required by different services may be focused on from the maintained IP segment quality table, and service scheduling, disaster tolerance analysis, abnormality alarm, and the like may be performed on related services based on the quality values of each IP segment under the corresponding quality indicators.

Figure 5:
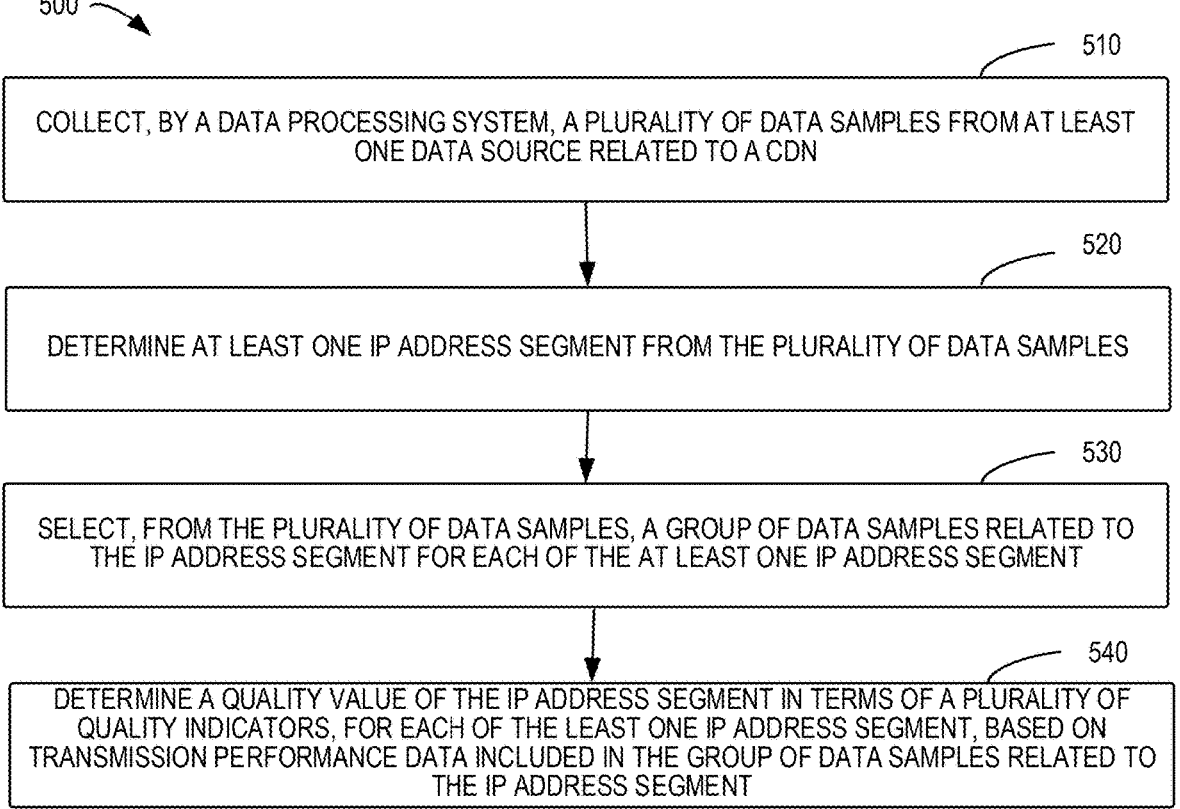
FIG. 5 illustrates a flowchart of an example of an IP quality data processing process in a CDN according to some embodiments of the present disclosure.

FIG. 5 illustrates a flowchart of an example of an IP quality data processing process 500 in a CDN according to some embodiments of the present disclosure. The process 500 may be implemented at the data processing system 120. For ease of discussion, the process 500 will be described with reference to the environment 100 of FIG. 1.

At block 510, the data processing system 120 collects a plurality of data samples from at least one data source related to the CDN.

In some embodiments, each data sample includes a client IP address and a service node IP address for performing data transmission in the CDN, and transmission performance data related to the data transmission.

At block 520, the data processing system 120 determines at least one IP address segment from the plurality of data samples.

In some embodiments, each IP address segment corresponds to an IP address range of a service node in the CDN.

At block 530, for each of the at least one IP address segment, the data processing system 120 selects, from the plurality of data samples, a group of data samples related to the IP address segment.

At block 540, for each of the at least one IP address segment, the data processing system 120 determines a quality value of the IP address segment in terms of a plurality of quality indicators based on transmission performance data included in the group of data samples related to the IP address segment.

In some embodiments, the at least one data source includes at least one of: actual operation data on at least one client in the CDN, detour data on at least one client in the CDN, operation data on at least one service node in the CDN, or detour data on at least one service node in the CDN.

In some embodiments, determining a target IP address segment to be assessed in the CDN; generating a detour task for the target IP address segment; and controlling the detour task for the target IP address segment to be performed in the CDN, and collecting the plurality of data samples includes: collecting, from at least one client or at least one service node in the CDN, detour data related to the detour task; and obtaining at least one data sample from the detour data.

In some embodiments, an IP segment quality table for the CDN is generated based on the quality value of the IP address segment in terms of the plurality of quality indicators, the IP segment quality table including at least one data entry, each data entry including at least an IP address segment, data corresponding to at least one data dimension associated with the IP address segment, and a quality value of the IP address segment in terms of the plurality of quality indicators. The data corresponding to the at least one data dimension associated with the IP address segment refers to other data besides the IP segment.

In some embodiments, in each data entry, the at least one data dimension associated with the IP address segment includes at least one of: information about a service node corresponding to the IP address segment, information about a client corresponding to the IP address segment, a service type corresponding to the IP address segment, a data source for determining the quality value of the IP address segment in terms of the plurality of quality indicators, or network information corresponding to the IP address segment.

In some embodiments, in response to a query request from a client in the CDN, an IP address segment for processing the query request is selected from the at least one IP address segment based on the at least one IP address segment and the quality value of each IP address segment in terms of the plurality of quality indicators.

In some embodiments, a first IP address segment with a quality abnormality is determined from the at least one IP address segment based on the at least one IP address segment and the quality value of each IP address segment in terms of the plurality of quality indicators; and an abnormality alarm for the first IP address segment is provided.

The embodiments of the present disclosure further provide corresponding apparatuses for implementing the above method or process.

Figure 6:
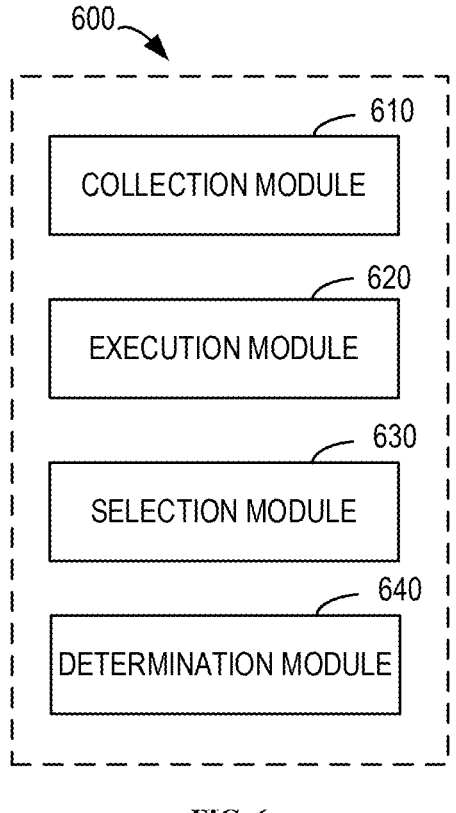
FIG. 6 illustrates a block diagram of an apparatus for IP quality data processing in a CDN according to some embodiments of the present disclosure.

FIG. 6 illustrates a block diagram of an apparatus 600 for IP quality data processing in a CDN according to some embodiments of the present disclosure. The apparatus 600 may be implemented as or included in the data processing system 120. Each module/component in the apparatus 600 may be implemented by hardware, software, firmware, or any combination thereof.

As shown in FIG. 6, the apparatus 600 includes a collection module 610 configured to collect a plurality of data samples from at least one data source related to the CDN, each data sample including a client IP address and a service node IP address for performing data transmission in the CDN, and transmission performance data related to the data transmission. The apparatus 600 further includes an execution module 620 configured to determine at least one IP address segment from the plurality of data samples, each IP address segment corresponding to an IP address range of a service node in the CDN. The apparatus 600 further includes a selection module 630 configured to: for each of the at least one IP address segment, select, from the plurality of data samples, a group of data samples related to the IP address segment. The apparatus 600 further includes a determination module 640 configured to: for each of the at least one IP address segment, determine a quality value of the IP address segment in terms of a plurality of quality indicators based on transmission performance data included in the group of data samples related to the IP address segment.

In some embodiments, each data sample includes a client IP address and a service node IP address for performing data transmission in the CDN, and transmission performance data related to the data transmission.

In some embodiments, each IP address segment corresponds to an IP address range of a service node in the CDN.

In some embodiments, the at least one data source includes at least one of: actual operation data on at least one client in the CDN, detour data on at least one client in the CDN, operation data on at least one service node in the CDN, or detour data on at least one service node in the CDN.

In some embodiments, the execution module 620 is further configured to: determine a target IP address segment to be assessed in the CDN; generate a detour task for the target IP address segment; and control the detour task for the target IP address segment to be performed in the CDN, and collecting the plurality of data samples includes: collecting, from at least one client or at least one service node in the CDN, detour data related to the detour task; and obtaining at least one data sample from the detour data.

In some embodiments, the determination module 640 is further configured to: generate an IP segment quality table for the CDN based on the quality value of the IP address segment in terms of the plurality of quality indicators, the IP segment quality table including at least one data entry, each data entry including at least an IP address segment, data corresponding to at least one data dimension associated with the IP address segment, and a quality value of the IP address segment in terms of the plurality of quality indicators.

In some embodiments, in each data entry, the at least one data dimension associated with the IP address segment includes at least one of: information about a service node corresponding to the IP address segment, information about a client corresponding to the IP address segment, a service type corresponding to the IP address segment, a data source for determining the quality value of the IP address segment in terms of the plurality of quality indicators, or network information corresponding to the IP address segment.

In some embodiments, the execution module 620 is further configured to: in response to a query request from a client in the CDN, select, from the at least one IP address segment, an IP address segment for processing the query request based on the at least one IP address segment and the quality value of each IP address segment in terms of the plurality of quality indicators.

In some embodiments, the determination module 640 is further configured to: determine, based on the at least one IP address segment and the quality value of each IP address segment in terms of the plurality of quality indicators, a first IP address segment with a quality abnormality from the at least one IP address segment; and provide an abnormality alarm for the first IP address segment.

The units and/or modules included in the apparatus 600 may be implemented in various ways, including software, hardware, firmware, or any combination thereof. In some embodiments, one or more units and/or modules may be implemented using software and/or firmware, such as machine-executable instructions stored on a storage medium. In addition to or as an alternative to the machine-executable instructions, some or all of the units and/or modules in the apparatus 600 may be implemented, at least in part, by one or more hardware logic components. As an example, rather than a limitation, example types of hardware logic components that may be used include a field programmable gate array (FPGA), an application specific integrated circuit (ASIC), an application specific standard product (ASSP), a system on chip (SOC), a complex programmable logic device (CPLD), and the like.

Figure 7:
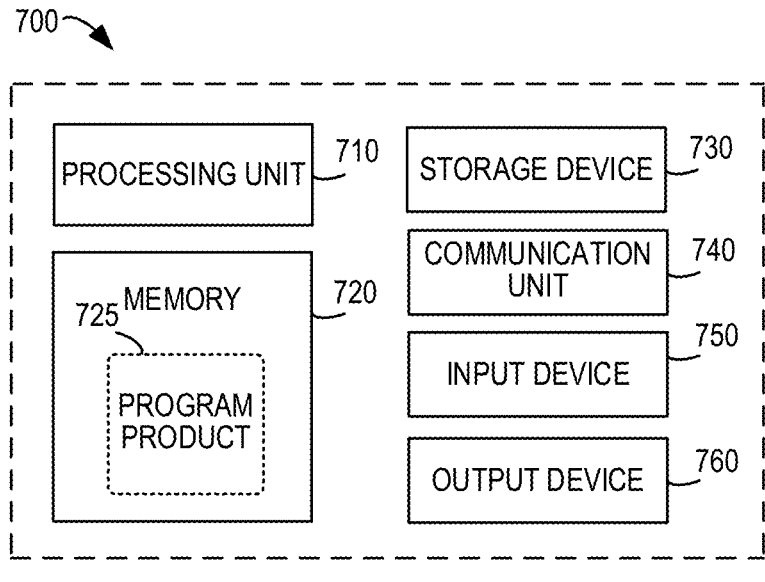
FIG. 7 illustrates a block diagram of an electronic device in which one or more embodiments of the present disclosure can be implemented.

FIG. 7 illustrates a block diagram of an electronic device 700 in which one or more embodiments of the present disclosure can be implemented. It should be understood that the electronic device 700 shown in FIG. 7 is only example and should not constitute any limitation to the function and scope of the embodiments described herein. The electronic device 700 shown in FIG. 7 may be used to implement the data processing system 120 in FIG. 1 or the apparatus 600 in FIG. 6.

As shown in FIG. 7, the electronic device 700 is in the form of a general-purpose computing device. The components of the electronic device 700 may include, but are not limited to, one or more processors or processing units 710, a memory 720, a storage device 730, one or more communication units 740, one or more input devices 750, and one or more output devices 760. The processing unit 710 may be a physical or virtual processor and can execute various processes according to a program stored in the memory 720. In a multi-processor system, multiple processing units execute computer-executable instructions in parallel to improve the parallel processing capability of the electronic device 700.

The electronic device 700 generally includes multiple computer storage media. Such media may be any available media accessible by the electronic device 700, including but not limited to volatile and non-volatile media, and detachable and non-detachable media. The memory 720 may be a volatile memory (for example, a register, a cache, a random access memory (RAM)), a non-volatile memory (for example, a read only memory (ROM), an electrically erasable programmable read only memory (EEPROM), a flash memory), or a certain combination thereof. The storage device 730 may be a detachable or non-detachable medium, and may include a machine-readable medium, such as a flash drive, a magnetic disk, or any other medium that can be used to store information and/or data and can be accessed within the electronic device 700.

The electronic device 700 may further include additional detachable/non-detachable, volatile/non-volatile storage media. Although not shown in FIG. 7, a disk drive for reading from or writing into a detachable, non-volatile disk (for example, a "floppy disk") and an optical disk drive for reading from or writing into a detachable, non-volatile optical disk may be provided. In these cases, each drive may be connected to a bus (not shown) through one or more data medium interfaces. The memory 720 may include a computer program product 725 having one or more program modules configured to perform various methods or actions of various embodiments of the present disclosure.

The communication unit 740 implements communication with other electronic devices through a communication medium. Additionally, the functions of the components of the electronic device 700 may be implemented in a single computing cluster or multiple computing machines that can communicate through communication connections. Therefore, the electronic device 700 may operate in a networked environment using a logical connection with one or more other servers, network personal computers (PCs), or another network node.

The input device 750 may be one or more input devices, such as a mouse, a keyboard, a tracking ball, and the like. The output device 760 may be one or more output devices, such as a display, a speaker, a printer, and the like. The electronic device 700 may also communicate with one or more external devices (not shown) through the communication unit 740 as required. The external devices, such as storage devices, display devices, etc., communicate with one or more devices that enable a user to interact with the electronic device 700, or communicate with any device (for example, a network card, a modem, etc.) that enables the electronic device 700 to communicate with one or more other electronic devices. Such communication may be performed via an input/output (I/O) interface (not shown).

According to an example implementation of the present disclosure, a computer-readable storage medium is provided, which stores computer-executable instructions, where the computer-executable instructions are executed by a processor to implement the method described above. According to an example implementation of the present disclosure, a computer program product is also provided, where the computer program product is physically stored on a non-transient computer-readable medium and includes computer-executable instructions, and the computer-executable instructions are executed by a processor to implement the method described above.

Various aspects of the present disclosure are described herein with reference to flowcharts and/or block diagrams of the method, apparatus, device, and computer program product implemented according to the present disclosure. It should be understood that each block of the flowcharts and/or block diagrams and the combination of the blocks in the flowcharts and/or block diagrams may be implemented by computer-readable program instructions.

These computer-readable program instructions may be provided to the processing unit of a general-purpose computer, a special-purpose computer, or other programmable data processing means to produce a machine, so that when these instructions are executed by the processing unit of the computer or other programmable data processing means, a device that implements the functions/actions specified in one or more blocks of the flowcharts and/or block diagrams is produced. These computer-readable program instructions may also be stored in a computer-readable storage medium, which causes the computer, the programmable data processing means, and/or other devices to work in a specific way, and therefore, the computer-readable medium storing the instructions includes a product, which includes instructions for implementing various aspects of the functions/actions specified in one or more blocks of the flowcharts and/or block diagrams.

The computer-readable program instructions may be loaded onto a computer, other programmable data processing means, or other devices, causing a series of operational steps to be performed on the computer, other programmable data processing means, or other devices to produce a computer-implemented process, such that the instructions executed on the computer, other programmable data processing means, or other devices implement the functions/ acts specified in one or more blocks in the flowcharts and/or block diagrams.

The flowcharts and block diagrams in the figures illustrate the architecture, functionality, and operation of possible implementations of systems, methods, and computer program products according to various implementations of the present disclosure. In this regard, each block in the flowcharts or block diagrams may represent a module, a program segment, or a portion of instructions, and the module, the program segment, or the portion of instructions includes one or more executable instructions for implementing specified logical functions. In some alternative implementations, the functions noted in the blocks may also occur out of the order noted in the figures. For example, two consecutive blocks may, in fact, be executed substantially in parallel, or the blocks may sometimes be executed in the reverse order, depending upon the functionality involved. It is also noted that each block of the block diagrams and/or flowcharts, and combinations of blocks in the block diagrams and/or flowcharts, may be implemented by a dedicated hardware-based system that performs the specified functions or acts, or may be implemented by a combination of dedicated hardware and computer instructions.

Various implementations of the present disclosure have been described above, and the above descriptions are example and not exhaustive, and are not limited to the disclosed implementations. Many modifications and variations are obvious to ordinary skill in the art without departing from the scope and spirit of the described implementations. The choice of terms used herein is intended to best explain the principles of the implementations, the practical application, or the improvement of the technology in the market, or to enable other ordinary skill in the art to understand the implementations disclosed herein.

The invention claimed is:

1. A method for Internet Protocol (IP) quality data processing in a content delivery network (CDN), comprising:

collecting a plurality of data samples from a plurality of data sources related to the CDN, each data sample comprising a client IP address and a service node IP address for performing data transmission in the CDN, and transmission performance data related to the data transmission;

determining at least one IP address segment from the plurality of data samples, each IP address segment corresponding to an IP address range of a service node in the CDN;

selecting, from the plurality of data samples, a group of data samples related to the IP address segment for each of the at least one IP address segment;

determining a quality value of the IP address segment in terms of a plurality of quality indicators, for each of the at least one IP address segment, based on transmission performance data comprised in the group of data samples related to the IP address segment;

generating an IP segment quality table for the CDN based on dimension information in at least one data dimension associated with the at least one IP address segment and the quality value of the at least one IP address segment in terms of the plurality of quality indicators, the IP segment quality table comprising at least one data entry, each data entry comprising at least an IP address segment, data corresponding to the at least one data dimension associated with the IP address segment, and a quality value of the IP address segment in terms of the plurality of quality indicators, and wherein generating the IP segment quality table comprises:

using the dimension information as legal dimension information in accordance with a determination that the dimension information meets a preset multi-dimensional standard, aggregating indicator information corresponding to each data containing the legal dimension information into an object, and forming objects obtained by aggregating a plurality of data respectively into the at least one data entry, wherein the indicator information comprises the dimension information and the quality indicator;

wherein the method further comprises:

determining, from the at least one IP address segment, a first IP address segment with a quality abnormality based on the at least one IP address segment and the quality value of each IP address segment in terms of the plurality of quality indicators; and providing an abnormality alarm for the first IP address segment.

2. The method according to claim 1, wherein the at least one data source comprises at least one of:

actual operation data on at least one client in the CDN, detour data on at least one client in the CDN, operation data on at least one service node in the CDN, or detour data on at least one service node in the CDN.

3. The method according to claim 1, further comprising:

determining a target IP address segment to be assessed in the CDN;

generating a detour task for the target IP address segment; and controlling the detour task for the target IP address segment to be performed in the CDN, and wherein collecting the plurality of data samples comprises:

collecting, from at least one client or at least one service node in the CDN, detour data related to the detour task; and obtaining at least one data sample from the detour data.

4. The method according to claim 1, wherein in each data entry, the at least one data dimension associated with the IP address segment comprises at least one of:

information about a service node corresponding to the IP address segment, information about a client corresponding to the IP address segment, a service type corresponding to the IP address segment, a data source for determining the quality value of the IP address segment in terms of the plurality of quality indicators, or network information corresponding to the IP address segment.

5. The method according to claim 1, further comprising:

selecting, in response to a query request from a client in the CDN, an IP address segment for processing the query request from the at least one IP address segment based on the at least one IP address segment and the quality value of each IP address segment in terms of the plurality of quality indicators.

6. An electronic device, comprising:

at least one processing unit; and at least one memory coupled to the at least one processing unit and storing instructions executable by the at least one processing unit, the instructions, when executed by the at least one processing unit, causing the electronic device to perform acts comprising:

collecting a plurality of data samples from a plurality of data sources related to the CDN, each data sample comprising a client IP address and a service node IP address for performing data transmission in the CDN, and transmission performance data related to the data transmission;

determining at least one IP address segment from the plurality of data samples, each IP address segment corresponding to an IP address range of a service node in the CDN;

selecting, from the plurality of data samples, a group of data samples related to the IP address segment for each of the at least one IP address segment;

determining a quality value of the IP address segment in terms of a plurality of quality indicators, for each of the at least one IP address segment, based on transmission performance data comprised in the group of data samples related to the IP address segment;

generating an IP segment quality table for the CDN based on dimension information in at least one data dimension associated with the at least one IP address segment and the quality value of the at least one IP address segment in terms of the plurality of quality indicators, the IP segment quality table comprising at least one data entry, each data entry comprising at least an IP address segment, data corresponding to the at least one data dimension associated with the IP address segment, and a quality value of the IP address segment in terms of the plurality of quality indicators, and wherein generating the IP segment quality table comprises:

using the dimension information as legal dimension information in accordance with a determination that the dimension information meets a preset multi-dimensional standard, aggregating indicator information corresponding to each data containing the legal dimension information into an object, and forming objects obtained by aggregating a plurality of data respectively into the at least one data entry, wherein the indicator information comprises the dimension information and the quality indicator;

wherein the acts further comprise:

determining, from the at least one IP address segment, a first IP address segment with a quality abnormality based on the at least one IP address segment and the quality value of each IP address segment in terms of the plurality of quality indicators; and providing an abnormality alarm for the first IP address segment.

7. The electronic device according to claim 6, wherein the at least one data source comprises at least one of:

actual operation data on at least one client in the CDN, detour data on at least one client in the CDN, operation data on at least one service node in the CDN, or detour data on at least one service node in the CDN.

8. The electronic device according to claim 6, wherein the acts further comprise:

determining a target IP address segment to be assessed in the CDN;

generating a detour task for the target IP address segment; and controlling the detour task for the target IP address segment to be performed in the CDN, and wherein collecting the plurality of data samples comprises:

collecting, from at least one client or at least one service node in the CDN, detour data related to the detour task; and obtaining at least one data sample from the detour data.

9. The electronic device according to claim 6, wherein in each data entry, the at least one data dimension associated with the IP address segment comprises at least one of:

information about a service node corresponding to the IP address segment, information about a client corresponding to the IP address segment, a service type corresponding to the IP address segment, a data source for determining the quality value of the IP address segment in terms of the plurality of quality indicators, or network information corresponding to the IP address segment.

10. The electronic device according to claim 6, wherein the acts further comprise:

selecting, in response to a query request from a client in the CDN, an IP address segment for processing the query request from the at least one IP address segment based on the at least one IP address segment and the quality value of each IP address segment in terms of the plurality of quality indicators.

11. A non-transitory computer-readable storage medium storing a computer program executable by a processor to performs acts comprising:

collecting a plurality of data samples from a plurality of data sources related to the CDN, each data sample comprising a client IP address and a service node IP address for performing data transmission in the CDN, and transmission performance data related to the data transmission;

determining at least one IP address segment from the plurality of data samples, each IP address segment corresponding to an IP address range of a service node in the CDN;

selecting, from the plurality of data samples, a group of data samples related to the IP address segment for each of the at least one IP address segment;

determining a quality value of the IP address segment in terms of a plurality of quality indicators, for each of the at least one IP address segment, based on transmission performance data comprised in the group of data samples related to the IP address segment;

generating an IP segment quality table for the CDN based on dimension information in at least one data dimension associated with the at least one IP address segment and the quality value of the at least one IP address segment in terms of the plurality of quality indicators, the IP segment quality table comprising at least one data entry, each data entry comprising at least an IP address segment, data corresponding to the at least one data dimension associated with the IP address segment, and a quality value of the IP address segment in terms of the plurality of quality indicators, and wherein generating the IP segment quality table comprises:

using the dimension information as legal dimension information in accordance with a determination that the dimension information meets a preset multi-dimensional standard, aggregating indicator information corresponding to each data containing the legal dimension information into an object, and forming objects obtained by aggregating a plurality of data respectively into the at least one data entry, wherein the indicator information comprises the dimension information and the quality indicator;

wherein the acts further comprise:

determining, from the at least one IP address segment, a first IP address segment with a quality abnormality based on the at least one IP address segment and the quality value of each IP address segment in terms of the plurality of quality indicators; and providing an abnormality alarm for the first IP address segment.

12. The non-transitory computer-readable storage medium according to claim 11, wherein the at least one data source comprises at least one of:

actual operation data on at least one client in the CDN, detour data on at least one client in the CDN, operation data on at least one service node in the CDN, or detour data on at least one service node in the CDN.

13. The non-transitory computer-readable storage medium according to claim 11, wherein the acts further comprise:

determining a target IP address segment to be assessed in the CDN;

generating a detour task for the target IP address segment; and controlling the detour task for the target IP address segment to be performed in the CDN, and wherein collecting the plurality of data samples comprises:

collecting, from at least one client or at least one service node in the CDN, detour data related to the detour task; and obtaining at least one data sample from the detour data.

14. The non-transitory computer-readable storage medium according to claim 11, wherein in each data entry, the at least one data dimension associated with the IP address segment comprises at least one of:

information about a service node corresponding to the IP address segment, information about a client corresponding to the IP address segment, a service type corresponding to the IP address segment, a data source for determining the quality value of the IP address segment in terms of the plurality of quality indicators, or network information corresponding to the IP address segment.

15. The non-transitory computer-readable storage medium according to claim 11, wherein the acts further comprise:

selecting, in response to a query request from a client in the CDN, an IP address segment for processing the query request from the at least one IP address segment based on the at least one IP address segment and the quality value of each IP address segment in terms of the plurality of quality indicators.

\* \* \* \* \*